US012037862B2

(12) United States Patent
Kelly, III et al.

(10) Patent No.: US 12,037,862 B2
(45) Date of Patent: Jul. 16, 2024

(54) UNIVERSAL GRAPPLE OVERSHOT FOR FISHING IRREGULAR SHAPED OBJECTS

(71) Applicant: Saudi Arabian Oil Company, Dhahran (SA)

(72) Inventors: Benton Kelly, III, Dhahran (SA); Ahmed Al-Ramadhan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 779 days.

(21) Appl. No.: 17/135,182

(22) Filed: Dec. 28, 2020

(65) Prior Publication Data

US 2022/0205332 A1 Jun. 30, 2022

(51) Int. Cl.
*E21B 31/18* (2006.01)
*E21B 31/12* (2006.01)

(52) U.S. Cl.
CPC ............ *E21B 31/18* (2013.01); *E21B 31/125* (2013.01)

(58) Field of Classification Search
CPC ......... E21B 31/12; E21B 31/125; E21B 31/18
USPC ...................... 294/86.42, 86.11, 86.26, 86.27
See application file for complete search history.

(56) References Cited

U.S. PATENT DOCUMENTS

| 1,521,789 | A | | 1/1925 | Vincent | |
|---|---|---|---|---|---|
| 2,249,119 | A | * | 7/1941 | Di Palma | B25B 27/02 29/283 |
| 3,122,806 | A | * | 3/1964 | Lewis | F16G 11/103 174/79 |
| 3,697,114 | A | | 10/1972 | Chatard et al. | |
| 3,872,861 | A | | 3/1975 | Tamny et al. | |
| 3,912,320 | A | * | 10/1975 | Keenan, Jr. | E21B 31/18 294/86.26 |
| 3,979,106 | A | | 9/1976 | Jaques | |
| 4,969,677 | A | * | 11/1990 | Melegari | F16L 55/18 405/184 |
| 5,106,140 | A | | 4/1992 | Knotts | |

(Continued)

FOREIGN PATENT DOCUMENTS

CN 112127824 A 12/2020
WO 2017212276 A1 12/2017

OTHER PUBLICATIONS

International Search Report and Written Opinion for International Application No. PCT/US2021/065188, report mail date Mar. 3, 2022; pp. 1-13.

*Primary Examiner* — Dean J Kramer
(74) *Attorney, Agent, or Firm* — Bracewell LLP; Constance G. Rhebergen; Keith R. Derrington (57) ABSTRACT

Systems and methods for retrieving equipment from a wellbore of a subterranean well include an overshot housing having a central axis. The overshot housing is a tubular shaped member with a housing bore. An internal sleeve is located within the overshot housing. The internal sleeve is a tubular shaped member with a sleeve bore. The internal sleeve is axially moveable within the overshot housing. A catching net is located radially outward of the internal sleeve, within the overshot housing. The catching net moveable between a contracted position and an extended position. The catching net has a shorter axial length and a wider radial width in the contracted position than in the extended position. An anchoring assembly is located at a downhole end of the catching net. The anchoring assembly is actuable to releasably secure the downhole end of the catching net to the equipment.

18 Claims, 4 Drawing Sheets

(56) References Cited

U.S. PATENT DOCUMENTS

| | | |
|---|---|---|
| 6,719,052 B1 | 4/2004 | Harmon et al. |
| 7,083,209 B2 | 7/2006 | Leman et al. |
| 7,686,073 B1 | 3/2010 | Reynolds |
| 9,004,182 B2 | 4/2015 | O'Connor et al. |
| 9,864,381 B2 | 1/2018 | Carlson et al. |
| 10,253,588 B2 | 4/2019 | Larsen |
| 2020/0325733 A1 | 10/2020 | Sinclair et al. |

* cited by examiner

UNIVERSAL GRAPPLE OVERSHOT FOR FISHING IRREGULAR SHAPED OBJECTS

BACKGROUND OF THE DISCLOSURE

1. Field of the Disclosure

The disclosure relates generally to the operation of a subterranean well, and more particularly to retrieving lost equipment from within the subterranean well.

2. Description of the Related Art

There are times during the development of subterranean wells that equipment is lost downhole. Such lost equipment is often know as fish. Current methods of retrieving equipment that has been lost downhole includes the use of an overshot with a grapple. As an example, either a basket grapple or a spiral grapple can be used to engage the lost equipment, and retrieve the lost equipment to the surface. When using a basket grapple or spiral grapple, the grapple is selected to match the size of the outer diameter of the lost equipment to be retrieved.

SUMMARY OF THE DISCLOSURE

When using currently available basket grapple or spiral grapple overshots, only regular shaped equipment can be retrieved from the wellbore. Currently available basket grapple and spiral grapple overshots lack the ability to retrieve irregular shaped lost equipment, or fish.

Embodiments of this disclosure provide a grapple that includes a steel wire catching net that can capture and retrieve a range of shapes and sizes of equipment that has been lost in a wellbore. The retrieval tool with the catching net can be run into the well on a drill pipe. When the top of the lost equipment has been located, the overshot can lowered over the equipment until the equipment contacts a neck of an internal sleeve of the retrieval tool.

By applying a predetermined set down weight, the internal sleeve will move up and actuate an anchoring assembly that is part of the downhole end of the catching net. By moving the internal sleeve uphole, the shape of the catching net will engage the outer surface of the lost equipment and allow for the lost equipment to be retrieved from the well.

In an embodiment of this disclosure, a system for retrieving equipment from a wellbore of a subterranean well includes an overshot housing having a central axis. The overshot housing is a tubular shaped member with a housing bore. An internal sleeve is located within the overshot housing. The internal sleeve is a tubular shaped member with a sleeve bore. The internal sleeve is axially moveable within the overshot housing. A catching net is located radially outward of the internal sleeve and within the overshot housing. The catching net is moveable between a contracted position and an extended position. The catching net has a shorter axial length and a wider radial width in the contracted position than in the extended position. An anchoring assembly is located at a downhole end of the catching net. The anchoring assembly is actuable to releasably secure the downhole end of the catching net to the equipment.

In alternate embodiments, a shear pin extends between the internal sleeve and the overshot housing. The shear pin is shearable with contact between an uphole end of the equipment and a sleeve neck of the internal sleeve. The anchoring assembly can include a plurality of magnets spaced circumferentially around the downhole end of the catching net. The plurality of magnets can be magnetized to engage the equipment when the anchoring assembly is actuated. Alternately, each of the plurality of magnets can be magnetized to engage another of the plurality of magnets when the anchoring assembly is actuated. The catching net can be formed of a woven abrasive steel wire.

In an alternate embodiment of this disclosure, a system for retrieving equipment from a wellbore of a subterranean well has an overshot housing having a central axis. The overshot housing is a tubular shaped member with a housing bore. A drill pipe is secured to the overshot housing and is operable to deliver the overshot housing into the subterranean well. An internal sleeve is located within the overshot housing. The internal sleeve is a tubular shaped member with a sleeve bore. The internal sleeve is axially moveable within the overshot housing. A catching net is located radially outward of the internal sleeve and within the overshot housing. The catching net is moveable between a contracted position and an extended position. The catching net has a shorter axial length and a wider radial width in the contracted position than in the extended position. A shear pin extends between the internal sleeve and the overshot housing. The shear pin is shearable with contact between an uphole end of the equipment and a sleeve neck of the internal sleeve.

In alternate embodiments, the anchoring assembly can be located at a downhole end of the catching net. The anchoring assembly can be actuable to releasably secure the downhole end of the catching net to the equipment. The anchoring assembly can include a plurality of magnets spaced circumferentially around the downhole end of the catching net. The plurality of magnets can be operable to reduce a radial dimension of the downhole end of the catching net. The catching net can be formed of a woven abrasive steel wire.

In an alternate embodiment of this disclosure, a method for retrieving equipment from a wellbore of a subterranean well includes delivering an overshot housing in the wellbore. The overshot housing is a tubular shaped member with a housing bore and having a central axis. A downhole end of a catching net is releasably secured to the equipment by actuating an anchoring assembly located at the downhole end of the catching net. An internal sleeve is moved axially in an uphole direction. The internal sleeve is a tubular shaped member with a sleeve bore and being located within the housing bore. The catching net is extended from a contracted position to an extended position to engage the equipment. The catching net is located radially outward of the internal sleeve and within the overshot housing. The catching net has a shorter axial length and a wider radial width in the contracted position than in the extended position.

In alternate embodiments, a shear pin can extend between the internal sleeve and the overshot housing and the method can further include shearing the shear pin with contact between an uphole end of the equipment and a sleeve neck of the internal sleeve. Actuating the anchoring assembly can include moving the internal sleeve axially uphole relative to the overshot housing.

In other alternate embodiments, the anchoring assembly can include a plurality of magnets spaced circumferentially around the downhole end of the catching net. The method can include reducing a radial dimension of the downhole end of the catching net with the plurality of magnets when the anchoring assembly is actuated. The plurality of magnets can be magnetized to engage the equipment when the anchoring assembly is actuated. Alternatively, each of the plurality of magnets can be magnetized to engage another of the plurality of magnets when the anchoring assembly is actuated.

In yet other alternate embodiments, the catching net can be formed of a woven abrasive steel wire and the method can further include retrieving the equipment to a surface with the woven abrasive steel wire. Delivering the overshot housing in the wellbore can include delivering the overshot housing in the wellbore with a drill pipe that is secured to the overshot housing.

BRIEF DESCRIPTION OF THE DRAWINGS

So that the manner in which the previously-recited features, aspects and advantages of the embodiments of this disclosure, as well as others that will become apparent, are attained and can be understood in detail, a more particular description of the disclosure briefly summarized previously may be had by reference to the embodiments that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION OF THE DISCLOSURE

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
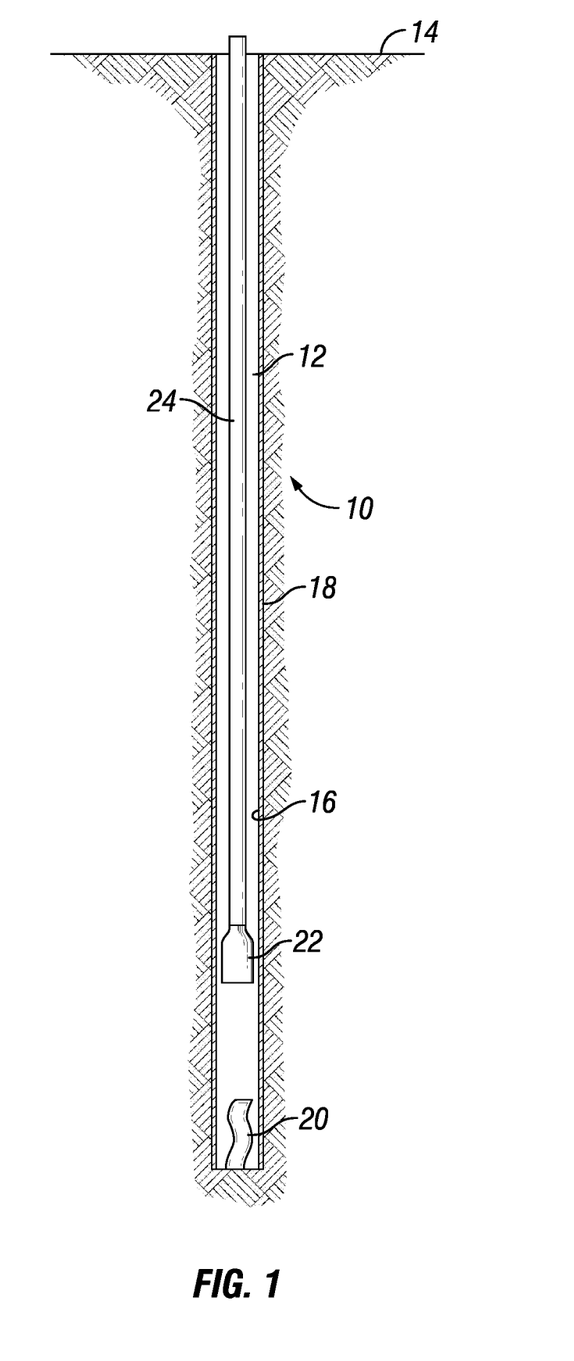
FIG. 1 is a schematic section view of a subterranean well with a retrieval tool, in accordance with an embodiment of this disclosure.

Looking at FIG. 1, subterranean well 10 can have wellbore 12 that extends to an earth's surface 14. Subterranean well 10 can be an offshore well or a land based well and can be a well associated with hydrocarbon development operations, such as, for example, a hydrocarbon production well, an injection well, or a water well. Wellbore 12 can be drilled from surface 14 and into and through various subterranean formations. In the example of FIG. 1, wellbore 12 extends generally vertically relative to the earth's surface 14. In alternate embodiments, at least a portion of wellbore 12 can be a horizontal well that extends generally horizontally relative to the earth's surface 14, or can be an inclined well that extends at another angle relative to earth's surface 14.

Casing 16 can line an inner diameter surface of wellbore 12. Casing 16 can be formed of a series of tubular pipe joints that are secured end to end. Casing 16 can be a tubular member that has a bore. In alternate embodiments, wellbore 12 can have an unlined or open hole that is free of casing over at least a portion of a length of wellbore 12.

There may be times during the development or operation of subterranean well 10 that equipment 20 is lost within wellbore 12. Equipment 20 is commonly called fish or junk. Equipment 20 can be, for example, junk metal, tools, parts or pieces of drill pipe or drill collars, drilling components, or other components used within the subterranean well 10. Equipment 20 that is accidentally dropped or left within wellbore 12 can fall to the bottom of wellbore 12. Retrieval tool 22 can be used to retrieve lost equipment 20 from wellbore 12. Retrieval tool 22 can be lowered into wellbore 12 on drill pipe 24. Retrieval tool 22 can be lowered to reach equipment 20.

Figure 2:
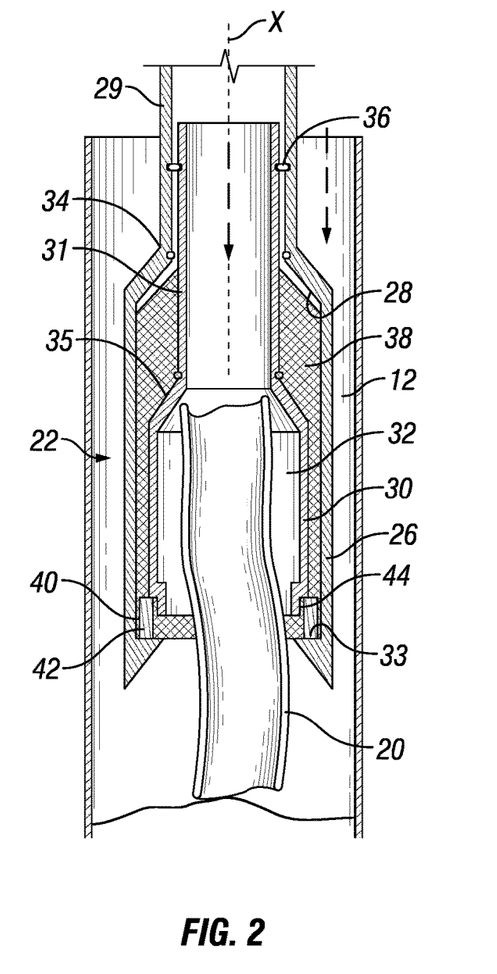
FIG. 2 is a schematic section view of a retrieval tool being lowered over lost equipment within a subterranean well, in accordance with an embodiment of this disclosure.

Looking at FIG. 2, retrieval tool 22 can include overshot housing 26. Overshot housing 26 is a generally tubular shaped member that has a housing bore 28. Housing bore 28 is an open internal space within overshot housing 26. Overshot housing 26 further has a central axis X. Housing stem 29 is located at an uphole end of overshot housing 26. Housing stem 29 has a narrower diameter than a downhole portion of overshot housing 26. Housing stem 29 meets the downhole portion of overshot housing 26 at a housing neck 34. Housing neck 34 is a frusto-conical shaped member that defines a transition between the downhole portion of overshot housing 26 and housing stem 29. Housing stem 29 is secured to drill pipe 24 (FIG. 1) for lowering retrieval tool 22 into wellbore 12.

Housing bore 28 also includes upward facing housing shoulder 33. Housing shoulder 33 is located at a downhole end of overshot housing 26. Housing shoulder 33 extends radially inward from the inner diameter surface of housing bore 28.

Internal sleeve 30 of retrieval tool 22 is located within housing bore 28 of overshot housing 26. Internal sleeve 30 is a generally tubular shaped member that has a sleeve bore 32. Sleeve bore 32 is an open internal space within internal sleeve 30. Internal sleeve 30 has an axial height that is shorter than an axial height of housing bore 28 so that internal sleeve 30 is axially moveable within overshot housing 26. Internal sleeve 30 has sleeve stem 31 that is located at an uphole end of internal sleeve 30. Sleeve stem 31 has a narrower diameter than a downhole portion of internal sleeve 30. Sleeve stem 31 extends into housing stem 29 and an uphole terminal end of sleeve stem 31 is located within housing stem 29. Sleeve stem 31 meets the downhole portion of internal sleeve 30 at a sleeve neck 35. Sleeve neck 35 is a frusto-conical shaped member that defines a transition between the downhole portion of internal sleeve 30 and sleeve stem 31.

Shear member 36 extends between internal sleeve 30 and overshot housing 26. In the example embodiment of FIG. 2, shear member 36 is intact and retains internal sleeve 30 in a lower position within overshot housing 26. Shear member 36 extends radially outward from sleeve stem 31 and into an inner diameter surface of housing stem 29. In the example embodiment of FIG. 2, two shear members 36 are shown. In alternate embodiments, one shear member 36 or more than 2 shear members 36 can be used.

Internal sleeve 30 operates as a trip plate. That is, axial force in an uphole direction on internal sleeve 30 relative to overshot housing 26 will cause shear member 36 to shear. The shearing of shear member 36 will allow for internal sleeve 30 to move axially relative to overshot housing 26. The trip plate can be tripped by contact between an uphole end of equipment 20 with internal sleeve 30. As the uphole end of equipment 20 contacts the sleeve neck 35, pushing internal sleeve 30 in an axially uphole direction relative to overshot housing 26 and shearing shear member 36. This shearing of shear member 36 confirms that equipment 20 has extended a sufficient distance within retrieval tool 22 that equipment 20 can be gripped by retrieval tool 22 and successfully removed.

Catching net 38 is located radially outward of internal sleeve 30 and within housing bore 28 of overshot housing 26. By locating catching net 38 in the annular space between an outer diameter surface of internal sleeve 30 and the inner diameter surface of housing bore 28, catching net 38 is protected from damage. Catching net 38 is protected from damage during the lowering of retrieval tool 22 through wellbore 12, and in particular when retrieval tool 22 is being lowered over equipment 20. As retrieval tool 22 is lowered over equipment 20, it is the inner diameter surface of sleeve bore 32 that could contact equipment 20.

Because catching net 38 is external of internal sleeve 30, catching net 38 cannot be snagged on or damaged by equipment 20. Not only does internal sleeve 30 protect catching net 38 from damage, because catching net 38 will not become hung up on equipment 20, it also allows for retrieval tool 22 to be lowered over equipment 20 a maximum amount structurally possible by the size of retrieval tool 22. This will increase the gripping surface area of equipment 20 that can be gripped by retrieval tool 22, increasing the gripping ability of retrieval tool 22, and maximizing the odds of successful removal of equipment 20.

Figure 4:
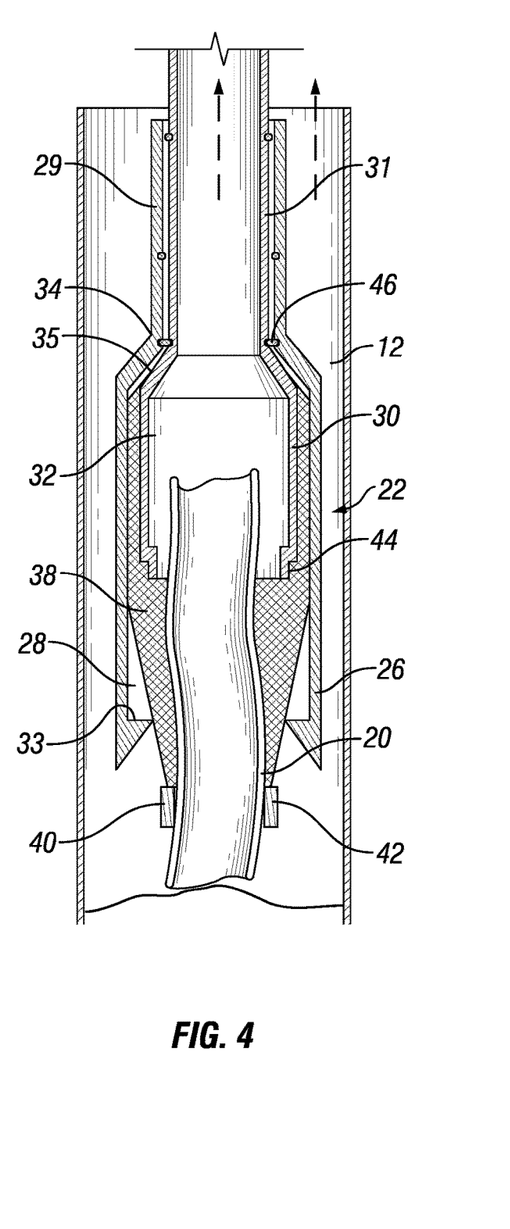
FIG. 4 is a schematic section view of a retrieval tool shown with a catching net engaging the lost equipment, in accordance with an embodiment of this disclosure.
Figure 5:
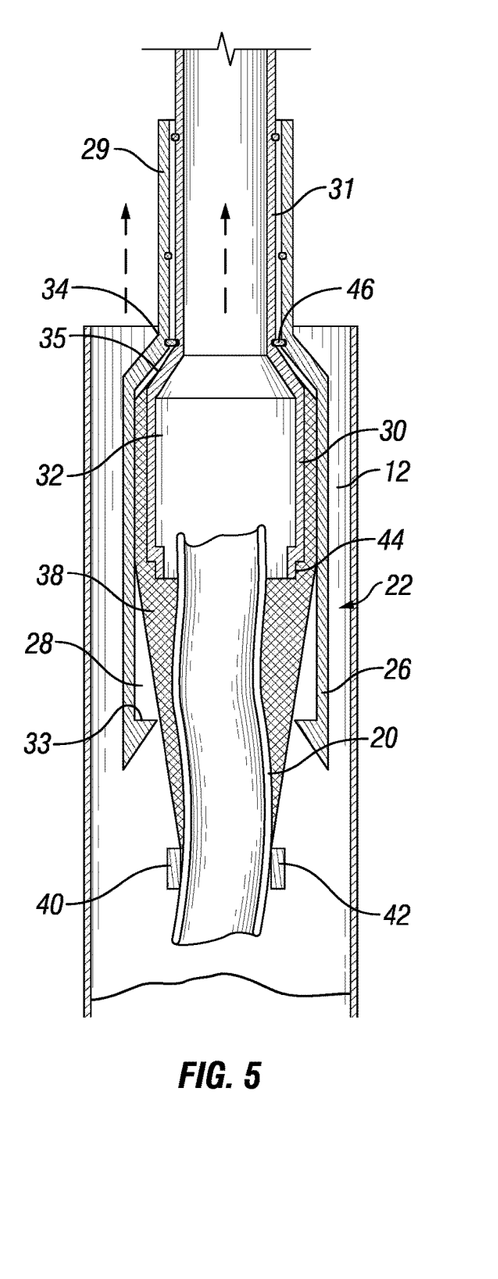
FIG. 5 is a schematic section view of a retrieval tool shown retrieving the lost equipment from the subterranean well, in accordance with an embodiment of this disclosure.

Catching net 38 is formed of a woven abrasive steel wire. Catching net 38 is moveable between a contracted position (FIG. 2) and an extended position (FIGS. 4-5). In the contracted position, catching net 38 has a shorter axial length and a wider radial width than when catching net 38 is in the extended position. In the extended position, the woven abrasive steel wire of catching net 38 can grip equipment 20 for retrieving equipment 20 to the surface.

An uphole end of catching net 38 can be fixed to an outer diameter surface of internal sleeve 30. The remaining portion of catching net 38 can expand and contract both axially and radially during operation of retrieval tool 22.

Anchoring assembly 40 is located at a downhole end of catching net 38. Anchoring assembly 40 can be actuated to secure the downhole end of catching net 38 to equipment 20. In the example embodiment, anchoring assembly 40 includes a plurality of magnets 42 spaced circumferentially around the downhole end of catching net 38.

Looking at FIG. 2, when internal sleeve 30 is in a lower position, magnets 42 are located radially outward of internal sleeve. Magnets 42 are positioned and held away from catching net 38 within radial groove 44 of internal sleeve 30. When internal sleeve 30 is in the lower position of FIG. 2, magnets 42 are supported on housing shoulder 33 of overshot housing 26. Internal sleeve 30 prevents magnets 42 from coming into contact with equipment 20 when internal sleeve 30 is in the lower position.

When shear member 36 is sheared by contact of the uphole end of equipment 20 with sleeve neck 35, internal sleeve 30 is free to move axially upward relative to overshot housing 26. Looking at FIG. 3, as retrieval tool 22 is moved further in a downhole direction, internal sleeve 30 is prevented from moving further in a downhole direction by the interaction between the uphole end of equipment 20 and sleeve neck 35. Overshot housing 26 will therefore move downhole relative to internal sleeve 30. Anchoring assembly 40 is actuated by internal sleeve 30 moving axially uphole relative to overshot housing 26. As overshot housing 26 and internal sleeve 30 are moved relatively apart from each other, magnets 42 are free to move radially inward to reduce a radial dimension of the down hole end of catching net 38.

Figure 3:
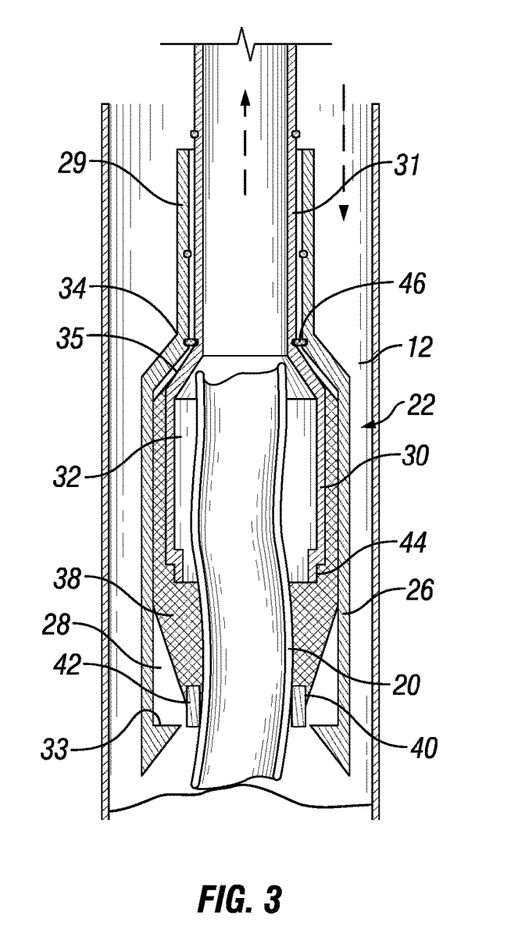
FIG. 3 is a schematic section view of a retrieval tool shown with an anchoring assembly engaging the lost equipment, in accordance with an embodiment of this disclosure.

In the embodiments of FIGS. 3-5, internal sleeve 30 is in an upper position and the radial groove of internal sleeve 30 is spaced uphole of magnets 42. After internal sleeve 30 reached the upper position, internal sleeve 30 can be locked into the upper position within overshot housing 26 by locking mechanism 46. Locking mechanism 46 can be, for example, a collet connector, a retractable pin, or a snap ring. Locking mechanism 46 can be supported on internal sleeve 30 and extend radially outward to engage a profile on the inner diameter surface of overshot housing 26.

Figure 5A:
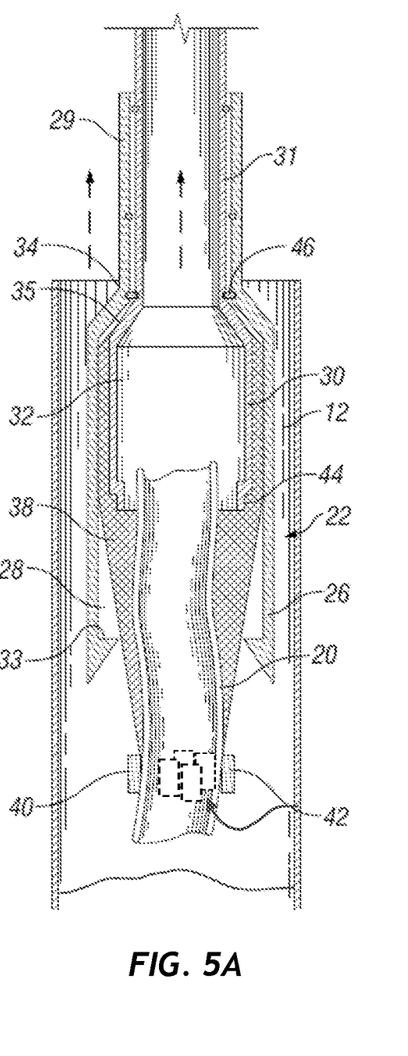
FIG. 5A is a schematic section view of a retrieval tool shown retrieving the lost equipment from the subterranean well, in accordance with another embodiment of this disclosure.

With internal sleeve 30 in the upper position, anchoring assembly 40 can secure the downhole end of catching net 38 to equipment 20 when equipment 20 is metallic or otherwise magnetic, and magnets 42 are magnetized to engage equipment 20. In alternate embodiments, such as when equipment 20 is not magnetic, shown in FIG. 5A, is that each of the magnets 42 can be magnetized to engage another of the magnets 42 when the anchoring assembly 40 is actuated.

Magnets 42 can be high powered magnets so that magnets 42 can have sufficient power to continue anchoring catching net 38 to equipment 20 as catching net 38 moves from the contracted position of FIG. 2, through a condition between a contract position and extended position, as shown in FIG.

3, and to the extended position of FIG. 4. As used in this disclosure, a high powered magnet can have a minimum of 10,000 gauss. Magnets 42, can be for example, at least samarium cobalt grade 2:17, alinco grade 5, or neodymuim grade N42 magnets.

After anchoring assembly 40 secures secure the downhole end of catching net 38 to equipment 20, retrieval tool 22 can be lifted in an axially uphole direction. Looking at FIG. 4, as retrieval tool 22 is lifted, catching net 38 can engage equipment 20. Due to the woven construction of catching net 38, axial weight on catching net 38 will tighten the catching net around equipment 20.

Looking at FIG. 5, continued movement of retrieval tool 22 in an axial uphole direction will allow retrieval tool 22 to retrieve and remove equipment 20 from wellbore 12. The woven abrasive steel wire of catching net 38 can grip equipment 20 for retrieving equipment 20 to the surface.

In an example of operation, looking at FIG. 1, if equipment 20 is lost within wellbore 12, retrieval tool 22 can be used to retrieve such lost equipment 20. Retrieval tool 22 can be secured to a downhole end of drill pipe 24 and lowered into wellbore 12.

Looking at FIG. 2, retrieval tool 22 can be lowered over an uphole end of equipment 20. Equipment 20 will enter sleeve bore 32 of internal sleeve 30. Looking at FIG. 3, when an uphole end of equipment 20 contacts and pushes against sleeve neck 35, shear member 36 can be sheared and anchoring assembly 40 will be actuated.

After shear member 36 is sheared, continued axial movement of internal sleeve 30 in an uphole direction relative to overshot housing 26 will cause the actuation of anchoring assembly 40. This relative movement of internal sleeve 30 to overshot housing 26 allows magnets 42 reducing a radial dimension of the downhole end of catching net 38.

Magnets 42 will releasably secure the downhole end of catching net 38 to equipment 20. In certain embodiments, magnets 42 will directly engage a magnetic equipment 20. In alternate embodiments, magnets 42 can be attached to each other so that the downhole end of catching net 38 engages non-magnetic equipment 20.

Looking at FIG. 4, internal sleeve 30 can be moved axially in an uphole direction to extend catching net 38 in an axial direction and move catching net from the contracted position of FIG. 2 to the extended position of FIG. 4. In the extended position catching net 38 can grip equipment 20.

Looking at FIG. 5, in the extended position, the woven abrasive steel wire of catching net 38 can grip equipment 20 with sufficient force for retrieving equipment 20 to the surface. Drill pipe 24 can be pulled from wellbore 12 to lift retrieval tool 22 and equipment 20 out of subterranean well 10.

Embodiments of this disclosure therefore provide systems and methods for retrieving lost equipment or fish without having to make numerous trips into the well to determine the exact inner diameter and outer diameter of the equipment or fish to be retrieved. Retrieval tool 22 of this disclosure instead can engage and remove lost equipment 20 of a variety of shapes and range of sizes. In addition, retrieval tool 22 can be inserted over a lost equipment 20 that has an irregular shape. The shearing of shear members 36 by contact of the upper end of equipment 20 with internal sleeve 30 can ensure that retrieval tool has been lowered a sufficient distance over equipment 20 to maintain a solid grip on equipment 20 during removal of equipment 20.

Embodiments of the disclosure described, therefore, are well adapted to carry out the objects and attain the ends and advantages mentioned, as well as others that are inherent. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A system for retrieving equipment from a wellbore of a subterranean well, the system having:
   an overshot housing having a central axis, the overshot housing being a tubular shaped member with a housing bore;
   an internal sleeve located within the overshot housing, the internal sleeve being a tubular shaped member with a sleeve bore, the internal sleeve being axially moveable within the overshot housing;
   a catching net located radially outward of the internal sleeve and within the overshot housing, the catching net moveable between a contracted position and an extended position, where the catching net has a shorter axial length and a wider radial width in the contracted position than in the extended position;
   an anchoring assembly located at a downhole end of the catching net, the anchoring assembly actuable to releasably secure the downhole end of the catching net to the equipment.

2. The system of claim 1, further including a shear pin extending between the internal sleeve and the overshot housing, the shear pin shearable with contact between an uphole end of the equipment and a sleeve neck of the internal sleeve.

3. The system of claim 1, where the anchoring assembly includes a plurality of magnets spaced circumferentially around the downhole end of the catching net.

4. The system of claim 3, where the plurality of magnets are magnetized to engage the equipment when the anchoring assembly is actuated.

5. The system of claim 3, where each of the plurality of magnets is magnetized to engage another of the plurality of magnets when the anchoring assembly is actuated.

6. The system of claim 1, where the catching net is formed of a woven abrasive steel wire.

7. A system for retrieving equipment from a wellbore of a subterranean well, the system having:
   an overshot housing having a central axis, the overshot housing being a tubular shaped member with a housing bore;
   a drill pipe secured to the overshot housing operable to deliver the overshot housing into the subterranean well;
   an internal sleeve located within the overshot housing, the internal sleeve being a tubular shaped member with a sleeve bore, the internal sleeve being axially moveable within the overshot housing; and
   a catching net within the overshot housing, the catching net comprising a woven mesh configured into an annular shape, so that when the catching net is axially lengthened while a lower end of the catching net circumscribes an end of the equipment, a radius of the catching net is reduced to draw the lowermost end of the catching net into engagement with the equipment.

8. The system of claim 7, where an anchoring assembly is located at the downhole end of the catching net, the anchoring assembly actuable to releasably secure the downhole end of the catching net to the equipment.

9. The system of claim 8, where the anchoring assembly includes a plurality of magnets spaced circumferentially around the downhole end of the catching net, the plurality of magnets operable to reduce a radial dimension of the downhole end of the catching net.

10. The system of claim 7, where axially lengthening the catching net reconfigures the catching net from a contracted position into an extended position, and when in the contracted position the sleeve is between the catching net and the equipment and in contact with the downhole end of the catching net, and when in the extended position, the sleeve is moved axially uphole and out of interfering contact between a lower portion of the catching net and the equipment.

11. A method for retrieving equipment from a wellbore of a subterranean well, the method including:
- delivering an overshot housing in the wellbore, the overshot housing being a tubular shaped member with a housing bore and having a central axis;
- releasably securing a downhole end of a catching net to the equipment by actuating an anchoring assembly located at the downhole end of the catching net;
- moving an internal sleeve axially in an uphole direction, the internal sleeve being a tubular shaped member with a sleeve bore and being located within the housing bore;
- extending the catching net from a contracted position to an extended position to engage the equipment, where the catching net is located radially outward of the internal sleeve and within the overshot housing, and where the catching net has a shorter axial length and a wider radial width in the contracted position than in the extended position.

12. The method of claim 11, where further including a shear pin extending between the internal sleeve and the overshot housing, the method further including shearing the shear pin with contact between an uphole end of the equipment and a sleeve neck of the internal sleeve.

13. The method of claim 12, where actuating the anchoring assembly includes moving the internal sleeve axially uphole relative to the overshot housing.

14. The method of claim 11, where the anchoring assembly includes a plurality of magnets spaced circumferentially around the downhole end of the catching net, and where the method includes reducing a radial dimension of the downhole end of the catching net with the plurality of magnets when the anchoring assembly is actuated.

15. The method of claim 14, where the plurality of magnets are magnetized to engage the equipment when the anchoring assembly is actuated.

16. The method of claim 14, where each of the plurality of magnets is magnetized to engage another of the plurality of magnets when the anchoring assembly is actuated.

17. The method of claim 11, where the catching net is formed of a woven abrasive steel wire and the method further includes retrieving the equipment to a surface with the woven abrasive steel wire.

18. The method of claim 11, where delivering the overshot housing in the wellbore includes delivering the overshot housing in the wellbore with a drill pipe that is secured to the overshot housing.

* * * * *